United States Patent
Stahlecker

(10) Patent No.: US 6,273,611 B1
(45) Date of Patent: Aug. 14, 2001

(54) BEARING FOR SPINDLES IN SPINNING OR TWISTING MACHINES

(75) Inventor: Gerd Stahlecker, Eislingen/Fils (DE)

(73) Assignees: Fritz Stahlecker, Bad Überkingen; Hans Stahlecker, Süssen, both of (DE)

( * ) Notice: Subject to any disclaimer, the term of this patent is extended or adjusted under 35 U.S.C. 154(b) by 0 days.

(21) Appl. No.: 09/412,321

(22) Filed: Oct. 5, 1999

(30) Foreign Application Priority Data

Dec. 3, 1998 (DE) .............................................. 198 65 774

(51) Int. Cl.[7] ...................................................... F16C 17/10
(52) U.S. Cl. ........................... 384/234; 384/231; 384/245
(58) Field of Search ..................................... 384/126, 231, 384/246, 245, 234, 581

(56) References Cited

U.S. PATENT DOCUMENTS

| | | | |
|---|---|---|---|
| 2,704,946 | * | 3/1955 | Gray et al. ........................ 384/231 X |
| 2,757,992 | * | 8/1956 | Schmid ................................. 384/231 |
| 2,973,229 | * | 2/1961 | Rogner ................................. 384/231 |
| 3,500,624 | * | 3/1970 | Polyakovsky et al. ........... 384/231 X |
| 3,510,181 | * | 5/1970 | Stahlecker ............................ 384/231 |
| 4,875,334 | * | 10/1989 | Rajsigl et al. .................... 384/144 X |
| 4,997,291 | * | 3/1991 | Braxmeier et al. ................... 384/227 |
| 5,119,620 | * | 6/1992 | Braxmeier ......................... 384/229 X |
| 5,182,901 | * | 2/1993 | Stahlecker ........................ 384/235 X |
| 5,528,892 | * | 6/1996 | Pesek et al. ...................... 384/231 X |
| 5,996,326 | * | 12/1999 | Braxmeier ........................ 384/231 X |

OTHER PUBLICATIONS

Suessen–Novibra Technical Information SCT 6114 ND, Technologie der Spindel HP–S 68. 09/95.

* cited by examiner

Primary Examiner—Charles A. Marmor
Assistant Examiner—Ha Ho
(74) Attorney, Agent, or Firm—Crowell & Moring, L.L.P.

(57) ABSTRACT

Spindles of spinning and twisting machines have a rotatable shaft supported in a bearing housing. The bearing housing comprises a neck bearing, a step bearing as well as a radially movable step bearing tube, which is arranged in an oil bath. The diameter of the shaft at the step bearing tube measures at the most six times the diameter at the neck bearing. Preferably, the diameter at the step bearing tube measures no more than between 3 and 3.5 mm. Thus the absolute bearing clearance in the step bearing tube can be significantly reduced, which results in a quieter running of the spindle and to a reduction in power consumption for the drive.

23 Claims, 1 Drawing Sheet

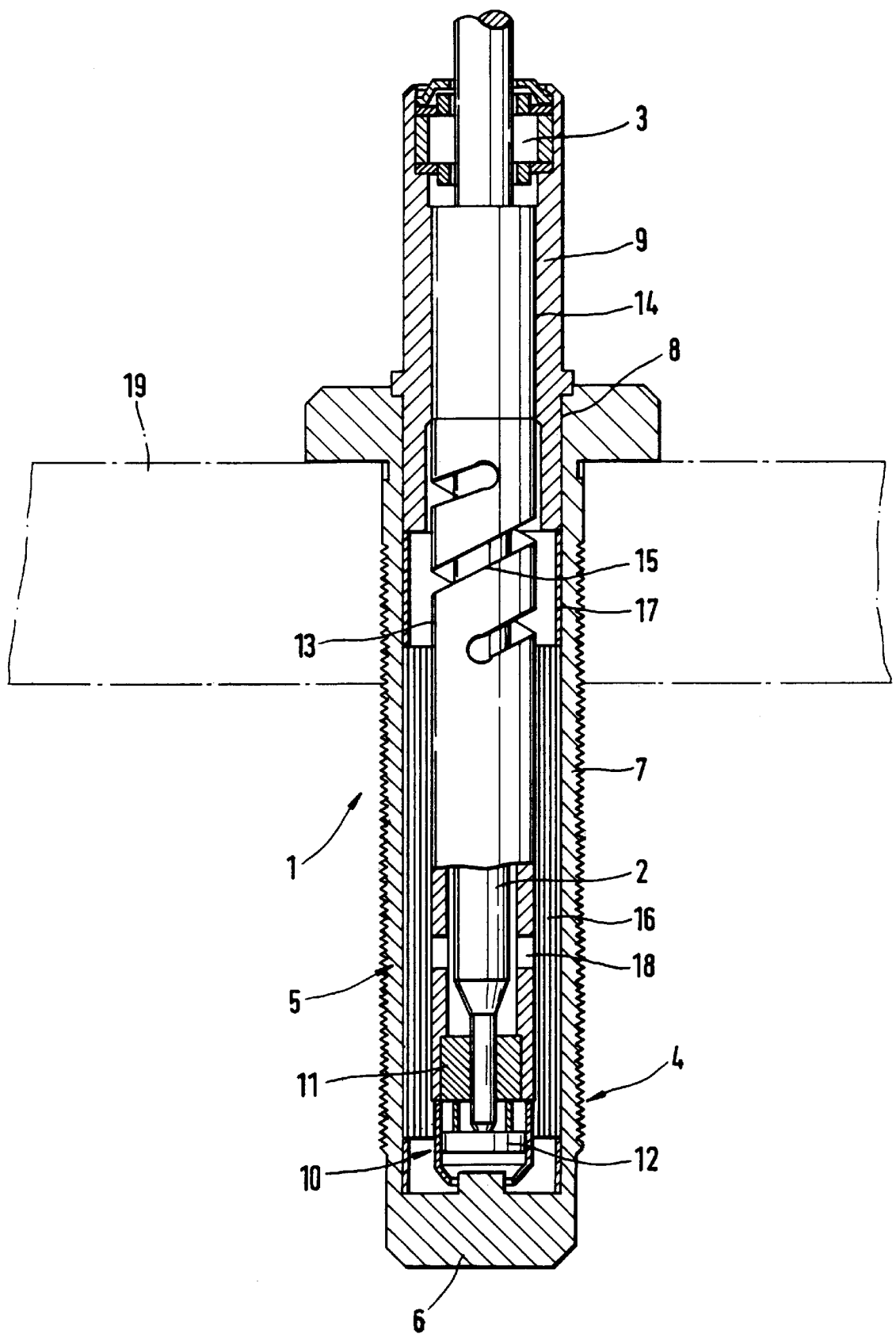

BEARING FOR SPINDLES IN SPINNING OR TWISTING MACHINES

BACKGROUND AND SUMMARY OF THE INVENTION

This application claims the priority of German application 198 65 774.4, filed Dec. 3, 1998, the disclosure of which is expressly incorporated by reference herein.

The present invention relates to a bearing arrangement for spindles in spinning and twisting machines comprising a rotatably supported shaft as well as a bearing housing, a neck bearing, a step bearing and a radially movable step bearing tube, which is arranged in an oil bath, whereby the diameter of the shaft is smaller at the step bearing tube than at the neck bearing.

Bearing arrangements of this type are well known in practice and are described, for example, in the brochure Suessen-Novibra Technical Information SCT.6114 ND. The shaft of standard spindles in the short staple field of practically all makes has a diameter at the neck bearing of approximately 6.8 mm and at the step bearing a diameter of approximately 4.5 mm, at a distance from the center of the neck bearing to the step bearing of 100 mm. These standard dimensions have become established over decades in practice as a presumed optimum. They take into account the fact that the shaft of the spindles must, in the area of the step bearing, be able to move radially to a certain degree, and that in particular the surface pressure at the step bearing must be under control.

For the smooth running of the spindle, the sliding bearing clearance in the step bearing is of great importance. Indeed, it would be desirable to reduce the bearing clearance. With the today standard spindle speeds of 22,000 rpm and more, a reduction in the bearing clearance leads however to an overheating of the step bearing, whereby small bubbles can form in the oil bath and thus lead to an occasional tearing off of the lubricating film.

It is an object of the present invention to improve the above mentioned bearing arrangement in such a way that a smaller bearing clearance than previously known is possible in the step bearing.

This object has been achieved in accordance with the present invention in that the diameter of the shaft at the step bearing measures at the most 0.6 times the diameter of the neck bearing.

By means of reducing the diameter of the shaft at the step bearing, the circumferential speed of the shaft at this point is reduced. Surprisingly, it has been shown that with this measure, bubble formation at the critical point can be avoided. The absolute bearing clearance can hereby be reduced in the desired way, which in turn leads to silenter running of the spindle. Advantageously, the difference in diameter between the shaft and the step bearing tube now measures 0.015 to 0.035 mm, at a diameter of the shaft of approximately 3 to 3.5 mm at this point.

Surprisingly, it has been established that, by applying the above mentioned measure, in addition the required power for the drive is reduced. A reduction of approximately 1 watt per spindle is possible.

In the case of lower spindle speeds, when the hydrodynamic pressure does not take up the bearing load at the step bearing completely, that is, the step bearing acts in the mixed friction area, further improvements of the spindle running can then be recorded when, between the shaft and the step bearing, a particularly narrow bearing gap is created in that the shaft at the step bearing tube is slightly spherical in form. As the shaft has to be ground in any case with a special grinding wheel in this area, the spherical grinding does not lead to a cost increase.

These and further objects, features and advantages of the present invention will become more readily apparent from the following detailed description of an embodiment of the invention.

BRIEF DESCRIPTION OF THE DRAWINGS

The single drawing FIGURE is a side sectional view of a spindle bearing and spindle assembly constructed according to a preferred embodiment of the invention.

DETAILED DESCRIPTION OF THE DRAWING

The vertically arranged spindle 1 of the present invention, for example for a ring spinning machine, comprises a shaft 2 driven to rotate, said shaft 2 being supported in a neck bearing 3 in the form of a roller bearing, and in a two-piece step bearing 4. The neck bearing 3 and the step bearing 4 are located in a bearing housing 5, which has a closed bottom 6.

The bearing housing 5 essentially comprises a tube 7 containing the bottom 6, and a bearing head 9 which takes up the neck bearing 3, which bearing head 9 is inserted from above into the tube 7 by means of a press fit 8. In the inside of the bearing housing 5, an oil bath is located in the area of the step bearing 4.

The step bearing 4 comprises a step bearing tube 11 which takes up the radial forces, and a step bearing 10 comprising a thrust plate 12 which takes up the axial forces. The step bearing tube 11 is supported in a centering tube 13, which in turn is affixed in the bearing head 9 by means of a press fit 14. The centering tube 13 comprises a helically-shaped recess 15, which renders the centering tube 13 flexible to a desired degree.

Between the cylindrical inner contour of the tube 7 and the cylindrical outer contour of the centering tube 13, an annular gap is located, which takes up in a known way an oil spiral 16. The oil spiral 16 is arranged in its entirety in the oil bath. By means of transverse bore holes 18 in the centering tube 13, the annular gap comprising the oil spiral 16 has a connection to the oil bath of the step bearing 4. The oil spiral 16 is supported upwards by means of a spacing tube 17.

The spindle 1, together with a plurality of further adjacently arranged spindles, is affixed in a spindle rail 19, denoted only by a dot-dash line, in a known way. A drive wharve (not shown) is further arranged at the spindle 1, whereby all drive wharves are driven by one drive belt extending in machine longitudinal direction.

With the exception of the diameter of the shaft 2 in the area of the step bearing 4, the bearing shown corresponds to the standard one used in practice. Thus, for example, the distance from the center of the neck bearing 3 to the tip of the shaft 2 at the bearing plate 12 measures 100 mm, to the center of the step bearing tube 11, approximately 94 mm. The diameter of the shaft 2 at the neck bearing 3 usually measures 6.8 mm, the diameter of the shaft 2 just above the step bearing tube 11, that is before the tapering of the shaft 2, measures approximately 6.3 mm. Bearing arrangements with these dimensions seemed to be fully developed, as they have been proven many millions of times over.

After extensive tests it has been now established that the silent running of the spindle 1 can be improved when the diameter of the shaft 2 in the step bearing tube 11 measures 3 to 3.5 mm maximum. Thus, at similar speeds of the spindle 1 as previously, the circumferential speed of the shaft 2 in the step bearing tube 11 can be reduced. A reduced absolute bearing clearance leads no longer to a tearing off of the lubricating film in the step bearing tube 11. Surprisingly, the power required for the drive is reduced at the same time.

Especially in the case of slow spindle speeds it is favorable when the gap between the shaft 2 and the step bearing tube 11 is particularly small. For this reason it is provided in further embodiments that the shaft 2 at the step bearing tube 11 has a slightly spherical form.

The placing of the step bearing tube 11 in a clamped flexible centering tube 13 in close proximity to the neck bearing 3 is not absolutely necessary for the invention. Rathermore it is alternatively possible, in a way not shown, to arrange the step bearing tube 11 in another radially movable way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bearing arrangement for spindles in spinning and twisting machines including:
   a rotatably supported shaft and a bearing housing with a neck bearing, a step bearing and a radially movable step bearing tube, said bearing tube being arranged in an oil bath, wherein the diameter of the shaft at the step bearing tube measures at the most 0.6 times the diameter of the shaft at the neck bearing, and wherein the diameter of the shaft at the step bearing tube measures approximately 3 to 3.5 mm.

2. A bearing arrangement according to claim 1, comprising a flexible centering tube disposed in the bearing housing and supporting the step bearing tube.

3. A bearing arrangement according to claim 1, wherein the diameter of the shaft measures approximately 6.8 mm at the neck bearing.

4. A bearing arrangement according to claim 2, wherein the diameter of the shaft measures approximately 6.8 mm at the neck bearing.

5. A bearing arrangement according to claim 1, wherein the diameter of the shaft measures approximately 6.3 mm directly above the step bearing tube.

6. A bearing arrangement according to claim 2, wherein the diameter of the shaft measures approximately 6.3 mm directly above the step bearing tube.

7. A bearing arrangement according to claim 3, wherein the diameter of the shaft measures approximately 6.3 mm directly above the step bearing tube.

8. A bearing arrangement according to claim 4, wherein the diameter of the shaft measures approximately 6.3 mm directly above the step bearing tube.

9. A bearing arrangement according to claim 1, wherein a difference in diameter between the shaft at the step bearing tube and the step bearing tube measures 0.015 to 0.035 mm.

10. A bearing arrangement according to claim 9, wherein the difference in diameter between the shaft at the step bearing tube and the step bearing tube measures 0.025 mm to 0.030 mm.

11. A bearing arrangement according to claim 2, wherein a difference in diameter between the shaft at the step bearing tube and the step bearing tube measures 0.015 to 0.035 mm.

12. A bearing arrangement according to claim 11, wherein the difference in diameter between the shaft at the step bearing tube and the step bearing tube measures 0.025 mm to 0.030 mm.

13. A bearing arrangement according to claim 1, wherein the distance from the center of the neck bearing to the step bearing tube measures approximately 94 mm.

14. A bearing arrangement according to claim 2, wherein the distance from the center of the neck bearing to the step bearing tube measures approximately 94 mm.

15. A bearing arrangement according to claim 3, wherein the distance from the center of the neck bearing to the step bearing tube measures approximately 94 mm.

16. A bearing arrangement according to claim 5, wherein the distance from the center of the neck bearing to the step bearing tube measures approximately 94 mm.

17. A bearing arrangement according to claim 9, wherein the distance from the center of the neck bearing to the step bearing tube measures approximately 94 mm.

18. A bearing arrangement according to claim 1, wherein the shaft at the step bearing is slightly spherical in form.

19. A bearing arrangement according to claim 2, wherein the shaft at the step bearing is slightly spherical in form.

20. A bearing arrangement according to claim 3, wherein the shaft at the step bearing is slightly spherical in form.

21. A bearing arrangement according to claim 5, wherein the shaft at the step bearing is slightly spherical in form.

22. A bearing arrangement according to claim 9, wherein the shaft at the step bearing is slightly spherical in form.

23. A bearing arrangement according to claim 13, wherein the shaft at the step bearing is slightly spherical in form.

* * * * *